United States Patent

[11] 3,590,937

| [72] | Inventor | Peter Andrews<br>190 Gebhardt Road, Penfield, N.Y. 14526 |
|---|---|---|
| [21] | Appl. No. | 750,094 |
| [22] | Filed | Aug. 5, 1968 |
| [45] | Patented | July 6, 1971<br>Continuation-in-part of application Ser. No. 508,625, Oct. 21, 1965, now Patent No. 3,396,810, dated Aug. 13, 1968, which is a division of application Ser. No. 288,159, June 17, 1963, now abandoned. |

[54] PROCESS INVENTION SUBSTANTIALLY PERFORMED IN A SURFACE, MATERIAL AND HEALTH PROTECTIVE APPARATUS
26 Claims, 17 Drawing Figs.

[52] U.S. Cl. .................................................. 180/69.1
[51] Int. Cl. .................................................. B62d 25/20
[50] Field of Search .................................. 180/69.1;
123/41.33

[56] References Cited
UNITED STATES PATENTS

| 1,163,317 | 12/1915 | Brush | 180/69.1 |
| 2,435,041 | 1/1948 | Hild | 123/41.33 X |
| 2,783,848 | 3/1957 | Beskid | 180/69.1 |
| 2,841,245 | 7/1958 | Colgan | 180/69.1 UX |
| 2,931,453 | 4/1960 | Inglese | 180/69.1 |

*Primary Examiner*—Benjamin Hersh
*Assistant Examiner*—Milton L. Smith

ABSTRACT: A process substantially performed in a motor vehicle fluid or oil dripping and/or centrifugally thrown-out fluid or oil retaining receptacle apparatus which is secured to a motor vehicle. This process invention is for increasing the rate of oxidation and thickening of the fluid retained substantially in at least one fluid retaining portion of the disclosed apparatus, whereby the retained fluid is increasingly prevented from being spilled, ejected or dumped substantially out of the apparatus and onto, for example, a roadway's, race track's or highway's, car, truck and/or bus-traveled surface, and thereby substantially prevents "summer icing" of the disclosed traveled surfaces and "viscous hydroplaning" of the motor vehicle's tires thereon, regardless if the motor vehicle is abruptly started, stopped, curving or traveling at a high rate of speed.

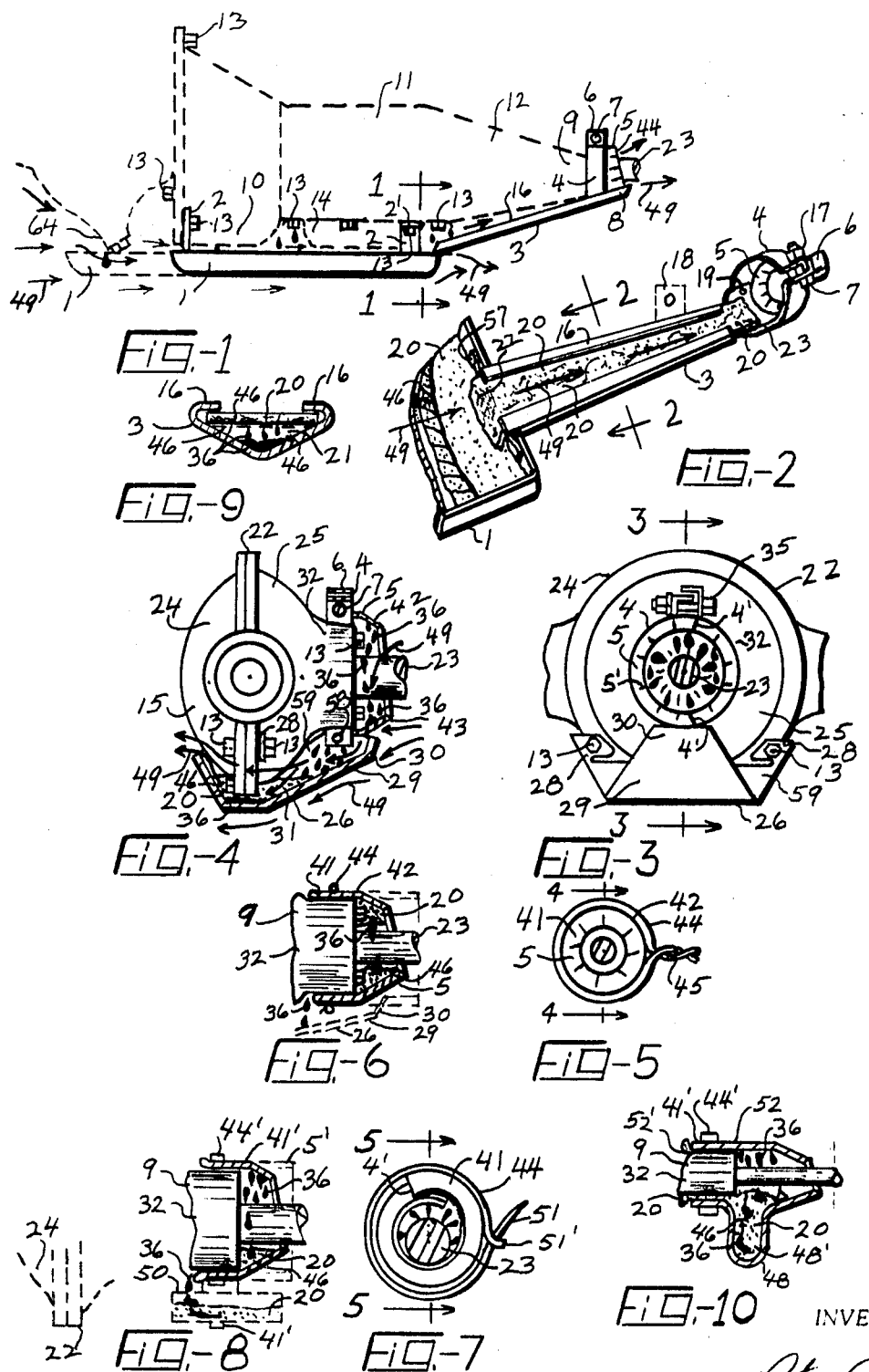

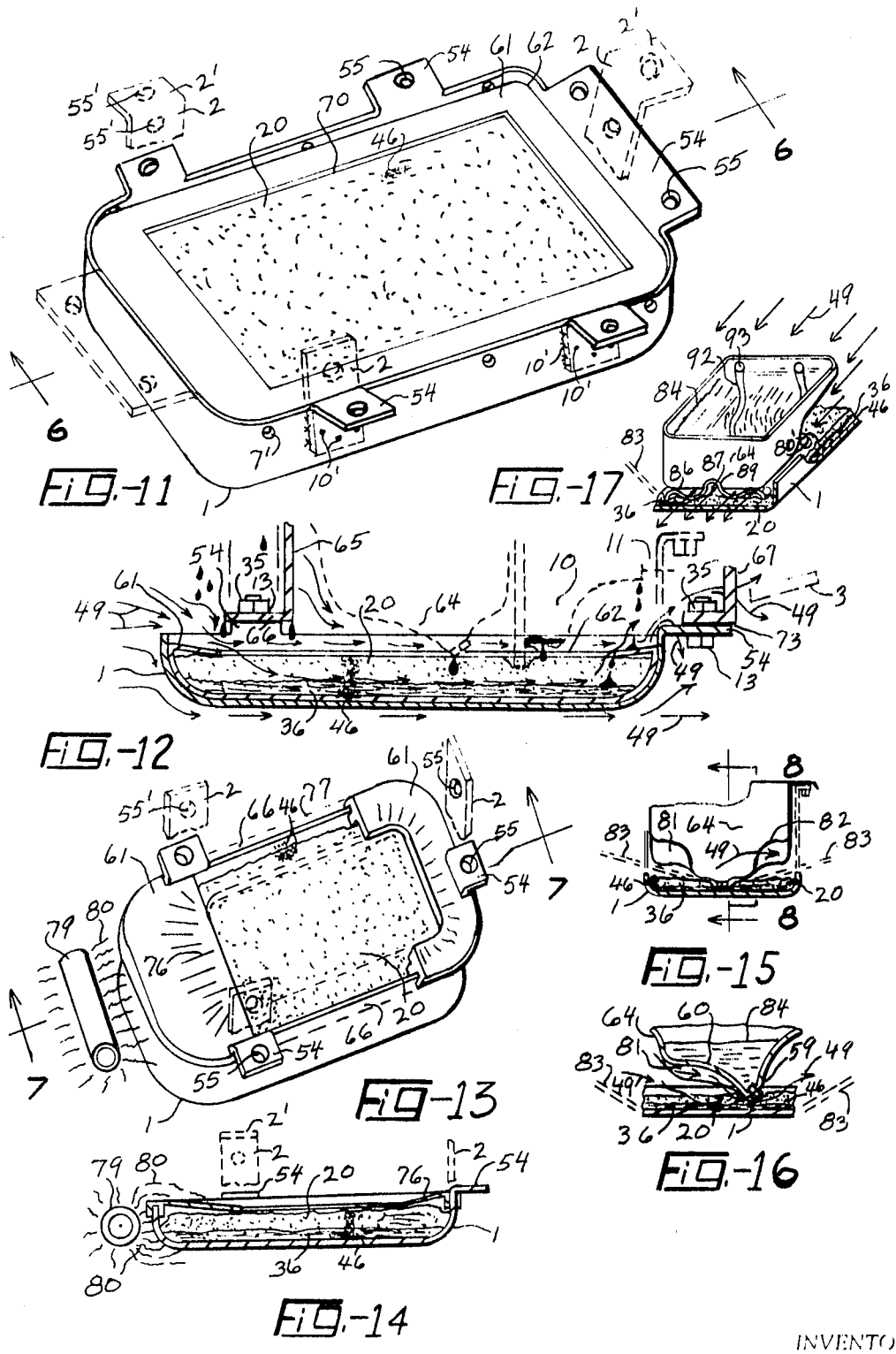

PROCESS INVENTION SUBSTANTIALLY PERFORMED IN A SURFACE, MATERIAL AND HEALTH PROTECTIVE APPARATUS

This is a continuation-in-part application of Ser. No. 508,625 application filed Oct. 21, 1965 and now U.S. Pat. No. 3,396,810 issued Aug. 13, 1968 and which 508,625 application was a divisional of the parent application Ser. No. 288,159 filed June 17, 1963 now abandoned.

DISCLOSURE OF INVENTION

This process invention is initiated in an apparatus which is in operative association with a motor vehicle, for example, a car, truck and/or bus, to prevent the surface of the and/or material that is substantially under all around a fluid-flinging, rotating shaft means, from becoming a slimy slippery surface, a disgustful sight, contaminated and/or impaired surface by the disclosed fluid which is thrown out by centrifugal force in substantially pinwheel fashion from a rotating shaft means thereof. The fluid also leaks and drips from various other parts of the motor vehicle as, for example, when it is parked, standing or slowly moving, for example, on the highway's surface whenever there is an accident, stalled motor vehicle, traffic jam and the like, ahead thereof.

Fluid-drip-receiving receptacles, pans, trampoline, shelflike, hinged pans and the like devices have previously been constructed and secured to a motor vehicle to retain fluid which only drips from under cars, trucks and buses, which devices were also designed to receive dripping fluid only when the motor vehicle is parked in a garage, driveway or street.

Not one prior art fluid-drip-retaining device, that I am aware of, suggested, hinted or disclosed that it was designed and arranged for a process to be performed therein, and which process increases the rate of oxidation and thickening of the retained fluid, as previously disclosed in this abstract of the invention.

Not one prior art device that I am aware of in whole or in part has secured a fluid-retaining collarlike apparatus to an above disclosed motor vehicle, to prevent the dripping and an exposed shaft centrifugally thrown-out fluid from being deposited on the highway's surface or the windshield of a following motor vehicle.

Not one prior art fluid-drip-retaining device, that I am aware of suggests, hints or discloses any process means for increasing the rate of oxidation and thickening of the dripping and/or centrifugally thrown-out captured fluid.

Three prior art fluid-drip-retaining patented devices are designed for specifically capturing the dripping fluid when the motor vehicle is parked in a garage or driveway and then use substantially a motor-vehicle-generated draft of air process for ejecting and/or dumping the receptacle-retained fluid directly on the roadway's or highway's surface, being for the direct opposite of the objects of this process invention.

The three prior art patented oil-discharger devices are the direct opposite to the objects of this invention.

The above fluid or oil ejecting and dumping prior art devices are respectively: W. G. Colgan, U.S. Pat. No. 2,841,245 filed May 10, 1956 and issued July 1, 1958; E. I. Phelps, U.S. Pat. No. 2,868,329 filed July 17, 1956 and issued Jan. 13, 1959; and again W. G. Colgan, U.S. Pat. No. 2,899,019 filed Nov. 4, 1957 and issued Aug. 11, 1959.

Another, prior art oil drip pan device of J. Beskid, U.S. Pat. No. 2,783,848, filed Aug. 13, 1954, and issued Mar. 5, 1957 forces his paperboard material 18, retained in his container 16, with force against the bottom of the oil pan sump or engine so it will not rattle when traveling at a high rate of speed on a highway, or a race track surface.

The above first three prior art fluid drip devices are a fluid-retaining receptacle when the motor vehicle is parked and yet they are transformed into a fluid-dumping funnel means when the motor vehicle is traveling at a fast rate of speed, for example, on a highway's surface.

The above three disclosed prior art devices are in fact for the direct opposite objects of substantially all the following principle objects of this process invention.

The process is further for at least increasing the rate of oxidation and thickening, of the dripped and/or thrown-out fluid, that is in at least one portion of the device, and/or in at least one separate material portion retained therein, and/or in at least one portion of a separate nestable receptacle unit retained therein.

The term "fluid" is used in this specification and claims to designate substantially an oil or grease mineral lubricants, having hydrocarbons therein.

The most important principle object of this process invention, is to at least: save lives and prevent accidents on the highways; save millions of dollars for the state and federal government combined; prevent further pollution of the air we breathe; save time and money for generally the motor vehicular public by less maintenance due to a reduced volume of fluid in the fluid-retaining receptacle portion of the apparatus.

Another principle object of this process invention is to generally prevent the motor-vehicular-traveled race track's roadway's or highway's surface it's becoming a "high surface tension surface" towards moisture, water or rain by preventing the motor vehicular dripping and rotating shaft means thrown-out captured fluid from substantially being deposited or even spilled, ejected or dumped onto the highway's surface, from the apparatus, especially if the motor vehicle is abruptly started, stopped, curving, or traveling at a high rate of speed.

And another principle object of this process invention is to prevent the roadway's or highway's surface from becoming a slimy slippery dangerous motor-vehicular-traveled surface, and especially when moisture or rain floats at least some of the spilled, ejected or dumped fluid, as by the previously disclosed three prior art devices of Colgan, Phelps and Colgan.

A further principle object of this process invention is to substantially prevent the air we breathe, the highway's surface, and generally the windshield of a following motor vehicle, from becoming polluted or covered by fluid ejecting and dumping prior-art devices whereby at least the windshield, for example if it should start to rain, would become at least momentarily a greasy opaque smeared surface, when the wipers are used, blocking driving view accordingly.

Another important principle object of this process invention is to have the process performed substantially in at least one portion of the apparatus and in at least one portion a separate material therein. The process for increasing the rate of oxidation and thickening of the captured and retained fluid by utilizing the motor-vehicular-generated draft of cold, warm, hot or arid air, solid or liquid catalyst means; oil-eating bacteria means; heat directly or indirectly from the exhaust system; and/or piping hot, warm or cold compressed air through the retained fluid, in a bubbling effect, as desired.

A yet another principle object of this process invention is to provide, place, or imbue an oil-eating bacteria and/or a catalyst or catalytic chemical means into at least one fluid-retaining portion of the apparatus and/or a separate material therein for substantially reducing the captured, or retained fluid therein to a reduced volume and/or thickened state, even when the fluid is accompanied by rainwater, slush, snow, and the like.

Another further principle object of this process invention is to have a separate material, pad or mat, or having a separate packaged material which is partitioned, sandwiched and the like, retained in at least one portion of the apparatus for retaining, absorbing and/or substantially further preventing the captured or retained fluid from spilling, splashing, being ejected or dumped out onto the highway's surface, especially if at least one portion of the material and or the apparatus is also bezel-topped, for example, as is a bed pan and the like, and if the motor vehicle is parked out of level; is inclining or reclining; is abruptly started, stopped or curving; and is traveling, for example, at a high rate of speed on a highway, race track, on tressels or in the water, whereby the latter two are each for an elevated monorail and a boat, specific motor vehicles, and which separate material efficiently retains the fluid therein so that at least one step of this process of reducing the fluid's volume may be more effectively enhanced.

Another object of this process invention is to have a separate material or a separate packaged, partitioned, sandwiched, bagged bezel-topped partitions, material which has an integral bezel-topped skin as in a foamed one retained in at least one portion of thereof by a means, and which material, disclosed package or any portion thereof is disposable, washable and rinsable, rechargeable with earth, garden soil, catalyst means, oil-eating bacteria means, oil-absorbing and/or a porous material means, as desired, so that at least one step of this process of dehydration and reducing the fluid's volume is again efficiently and effectively carried out substantially in the apparatus or substantially in a fluid-retaining portion thereof and/or material therein.

Another further object of this process invention is to provide a fluid-retaining apparatus which is secured by at least one safe means to the motor vehicle and yet which apparatus is of a safe, solid, cheap structure to buy, secure and maintain, in that the securing thereof to a motor vehicle is accomplished without drilling any holes, adding supports or hangers, or without using other bolt and/or hole means other than that which is actually accessible or available on or in the motor vehicle itself, and yet have at least one step of this process invention substantially carried out therein.

A still other object of this process invention is to capture or retain the dripping and/or centrifugally thrown-out fluid substantially in the apparatus material therein for, at least, saving lives, preventing accidents, preventing further pollution of the air we breathe, saving millions of dollars for the state and federal government combined and yet enable the motor vehicle owner to save money, because it will cost at least $35.00 to take an automatic transmission apart to replace a 75 cent fluid-leaking seal and at least $75.00 to additionally replace also the rear engine crankshaft fluid seal.

And another object of this process invention is to save lives and prevent accidents on a racetrack and also prevent a racing car from being excluded from, for example, the 500 mile Memorial Day Race at Indianapolis, by securing this apparatus to the motor vehicle even before any fluid does drip and/or is for example, centrifugally thrown out by a rotating shaft means, since any showing of fluid deposit from the racing motor vehicle results in automatic exclusion from the race, at any time thereof, just so long as at least one step of this process invention is carried out substantially, as above, in at least one portion of the apparatus.

Still another important object of at least one step of this process invention is to create or bring it to the attention of motor vehicle, for example car, truck and bus manufacturers, and city, state and federal authorities thereof, that this process invention is extremely necessary, useful, needed and essential with time being of the essence, to the motor vehicle public, state and federal government so that this apparatus would become standard, auxiliary, optional, optional-extra or an accessory equipment thereof.

A yet another important object of this process invention is to further increase the rate of oxidation and thickening of the fluid retained in at least one portion of the apparatus, even if air, liquid or solid catalyst, bacteria or the like fluid-thickening means for the retained fluid is in at least one portion of the heat from the motor vehicle's exhaust system, by conduction or convection means, increase the temperature of the retained fluid for substantially dehydrating it to at least one reduced-volume portion therein.

A still another object of this process invention is to increase the rate of oxidation of the fluid retained in the apparatus and/or material therein by piping and bubbling compressed air into the retained fluid in at least one portion of the apparatus, especially if the air is also heated by the exhaust system heat.

A still very important object of this process invention is to increase the rate of oxidation and thickening of the retained fluid in at least one portion of the apparatus and at the same time still indirectly cool by convection, the lubricating oil in the crankcase oil pan sump and/or the automatic transmission fluid sump by the draft of air which is drafting against at least one portion of the lowest underside wall portion of the disclosed sump and which air is generated by the forward drive motion of the motor vehicle, particularly when the vehicle is traveling in hot weather at high rates of motor vehicle speeds on a highway or racetrack, for example.

And still another object of this process invention is to increase the device's captured and retained fluid and/or the centrifugally thrown-out fluid, from a motor vehicle, and at the same time having the lubricating oil in the crankcase oil pan sump, cooled by circulating piped water from the radiator, substantially as is presently being done, in at least some of the automatic transmissions to the fluid therein so that at least one portion of at least one material in the fluid-retaining receptacle portion of the apparatus may be generally tight against the oil pan sump's bottom wall.

And a still further object of this process invention is to have at least the bottom wall of the crankcase oil pan sump in a corrugated shape, waveform, fin-shaped, boss-shaped, and/or having a separate material which automatically provides a spaced relation, of at least one material in at least one portion of the fluid-retaining portion of the apparatus, to the oil sump's bottom wall. A motor-vehicle-generated draft of air is thereby allowed to flow against at least one outer bottom wall portion of the oil pan sump, regardless what position or arrangement the separate material in the apparatus generally assumes thereagainst.

And yet a still further object of this process invention is to create a minimum of expense for motor vehicle transporting or carrying ferry boat and/or ferry type of train owners, through less maintenance of the apparatus in that the motor vehicle fluid dripping spots or puddles are substantially prevented on the motor vehicle's parking surfaces, generally in the disclosed boat or train, especially if there is a catalyst, napthnate, oil-eating bacteria the the like is in at least one portion of the apparatus.

A yet further object of this process invention is to create a minimum of expense for fluid dripping and/or centrifugally thrown-out fluid motor vehicle owners by reusing the main structure of the apparatus by having only the separate material retained in at least one portion thereof and/or a separate nestable receptacle which has the separate material retained therein be disposable as a unit when its fluid saturation point has been reached or exceeded, even if there also is a catalyst or bacteria means for the fluid substantially in the disposable units or at least one material therein.

A still yet further object of this process invention whereby a minimum of expense is further made possible for a fluid dripping and/or centrifugally thrown-out fluid motor vehicle owners is by having the separate material which is retained in at least one portion of the apparatus, be cleanable and/or washable and thereby is reusable, as is also a separate nestable receptacle which is also washable and reusable along with any separate generally partitioned material retained therein.

A still further additional object of this process invention is to increase the rate of oxidation and thickening of the fluid retained in the apparatus by inserting or piping an oil-thickening chemical means, for example napthnate and the like, therein.

A further important object of this process invention is to reduce the expense of manufacturing, handling, packaging, shipping and installation of the apparatus to a motor vehicle by using accessible bolt-securing means, accessible bore means and/or special bore means already provided therein for at least one portion of the apparatus as are seat-belt-anchoring bore means, inserted by a motor vehicle manufacturer.

These and other objects and advantages will become more apparent in the course of the following description in which the accompanying drawings form a part thereof and wherein:

FIG. 1 is a side view of one embodiment of the apparatus being secured to and under, in associated relationship, a portion of a motor vehicle.

FIG. 2 is an isometric view of the substantially channel-shaped trough portion of the apparatus substantially taken along sectional line 1-1 of FIG. 1.

FIG. 3 is substantially an axial front view of substantially another embodiment of the apparatus being secured to the differential housing of a motor vehicle.

FIG. 4 is a sectional view of the embodiment shown in FIG. 3 being substantially taken along sectional line 3-3, of FIG. 3.

FIG. 5 is substantially an axial front view of substantially another embodiment of the apparatus.

FIG. 6 is a side sectional view taken along sectional line 4-4 of FIG. 5 of the apparatus.

FIG. 7 is an axial front view of substantially a modified split version of the apparatus shown in FIG. 5.

FIG. 8 is a side sectional view taken along sectional line 5-5 of the FIG. 7 apparatus.

FIG. 9 is a sectional view taken substantially along sectional line 1-1 of the FIG. 1 apparatus.

FIG. 10 is a side sectional view of substantially another embodiment of the apparatus, generally as is FIG. 8 and taken substantially along sectional line 5-5 of FIG. 7.

FIG. 11 is an isometric top view a generally bezeled and louvered top or covered subcombination of substantially the lower receptacle 1 portion of FIG. 1 apparatus, without elements 3 and 20 secured thereto.

FIG. 12 is a sectional view taken along sectional line 6-6 of the FIG. 11 apparatus.

FIG. 13 is an isometric top view of a partially or entirely bezel-topped subcombination portion of the apparatus, and a section of pipe portion of the motor vehicle's exhaust system.

FIG. 14 is sectional view taken along sectional line 7-7 of FIG. 13 apparatus and pipe portion of the motor vehicle's exhaust system.

FIG. 15 is a front view of a specially designed crankcase oil pan sump having a corrugated bottom wall with a material retained in the apparatus thereagainst.

FIG. 16 is a sectional view taken along sectional line 8-8 of FIG. 15.

FIG. 17 is a front view of a separate corrugated air-spacing means for an apparatus, device, pan or trampoline type as desired.

FIG. 1 shows a fluid-impermeable troughlike receptacle 1 having a bottom wall and integral rectilinear side and end wall portions which merge into corner portions which integrally and fluid-impermeably connect adjacent side portions together. The view further shows at least one sidewall having an integral hanger means 2 having an end 2' which is at an angle to the upstanding portion of hanger 2. The end 2' having an opening (not shown) which is used for removably securing end 2' to at least one portion of the transmission, with available bolt-securing means 13. Another plain-ended hanger means 2 is also shown secured to the flange of, for example, the bell housing 10, also using accessible or available bolt 13 means. The view further shows a troughlike extension 3 extending out of the rear of receptacle 1 and upwardly at an angle towards the motor transmission 11 rear extension 12 and at least the fluid-retaining seal end 9 thereof. The upper end of trough 3 has a generally circular collarlike member 4 secured thereto. The member 4 having a generally inwardly, towards the drive shaft 23, formed substantially circular open-ended extension 5, and threaded bolt 7 for clamping the formed protrusion 6 and member 4, on end 9. The bolt 7 and nut, not shown, means tightly clamp the collarlike 4 member around the end 9, generally as shown in FIG. 3, for example, being on by member 4, as the shaft 23 is rotating especially at a high speed. The shaft 23 thereby, by centrifugal force, throws out the fluid 36 in substantially pinwheel fashion, for example, generally as shown in FIG. 4.

Fluid which generally drips from the rear crankshaft seal and especially also from an automatic transmission 11 front seal, will drip from the bell housing 10 and into the forward portion of receptacle 1. Should it be desired to extend the disclosed receptacle 1 also under at least the fluid dripoff point of the crankcase oil pan sump 64, for example, also shown partially in dashed line outline, then the FIG. 1 apparatus will substantially retain the fluid which drips from the oil pan sump 64, bell housing 10, transmission oil pan sump 14 and the end of extension 9, as well as the thrown-out fluid also from the rotating shaft 23. The receptacle 1 may even be constructed and extended beyond the front crossmember 65 portion of the frame generally as shown in FIG. 12 for example, and thereby be in the shape of a fluid-impermeable trough-shaped receptacle. Thereby fluid which leaks or drips directly or indirectly from at least one portion of the, front crankshaft seal, (not shown) or from the crossmember 65, oil pan sump 64, bell housing 10, oil pan 14, transmission 11, and/or and 9 will be retained in the apparatus generally shown in FIG. 1. Thereby the FIG. 1-disclosed apparatus is secured, arranged and positioned in such spaced relationship, under the motor vehicles, that the retained fluid's rate of oxidation and thickening is increased by the motor vehicle's generated draft of air 49 which is draftingly flowing against at least one portion of the material 20, which is shown in FIG. 2, and/or against at least one portion of the fluid retained in material 20 and/or receptacle 1, and/or against at least one portion of the fluid retained in the trough 3 and/or material therein, and/or against at least one portion of the fluid retained in the member 4, and/or the material 20 therein, and then partially exiting out of the rear opening 44 in member 4, generally as shown by arrow 49 means.

The upward end 8 of member 3 may also extend beyond the end 5 of member 4, as shown, whereby any fluid dripping from end 5 may be also retained in end 8.

The retained fluid's rate of oxidation and thickening is further increased by having a catalyst means, an oil-eating bacteria, and at least one portion of the heat from the motor vehicle's exhaust system, increase the temperature of the fluid retained in at least the receptacle 1 and/or material 20 therein. Air, especially heated air, may also be piped and bubbled through the fluid and/or material 20, retained in receptacle 1, if desired. And a heating element unit may also be submerged in the retained fluid as is generally disclosed in copending application Ser. No. 508,624 in FIG. 1 through 7, and copending application Ser. No. 532,831 in FIGS. 44 and 45, accordingly.

FIG. 2 is generally taken along sectional line 1-1 of FIG. 1 and shows a cutaway portion of disclosed receptacle 1, material 20 therein, trough 3 having formed over longitudinal edges 16 on substantially along both sides thereof for stiffening of trough 3, and/or retaining material 20 therein, and/or absorbing fluid 36 which flows therein from the member 4 and partially of which fluid flows into receptacle 1, and/or to substantially prevent the fluid which flows down from member 4, from being washed out by rainwater or ejected or forced over the otherwise plain sides by the motor vehicle's generated draft of air, especially when the vehicle is traveling at a high rate of forward speed. The view shows the shape of tapered end 5 of member 4; threaded nut 17, protrusion 6; spot welding, welded, riveted, and/or rigidly securing but yet removable, means 19. The flapped-down 22 and extended flaplike end of material 20 respectively in receptacle 1 and member 4 is also shown.

The lower end of member 3 is shown formed out 57 away from the inside wall of receptacle 1, if desired, so that any fluid which may be flowing down the underside of member 3, will also flow substantially into the receptacle 1.

The dashed line outline of only one tab or hanger means 18 is also shown. At least one hanger 18 means is, at times, used, when desired, especially if the member 4 is not constructed as shown, but is integrally, not shown formed out of the end 8, and is entirely in spaced relation around end 9 and/or has a cushioning material, for example 20 therebetween as is tab 23, for example, as is shown in FIG. 10.

FIG. 3 shows a drive shaft 23, axial front view of a fluid-retaining apparatus removably secured to the rear end or differential transmission housing 24. It further shows the collarlike member 4 secured to an end 32 of housing 24. The member 4 having at least one downwardly formed tab 58, see FIG. 4, being removably secured to at least one of the sides 59 of the lower portion of apparatus 26. The tapered end 5 of member 4 is shown with overlapping edge 4', and forming slits 5' which aids in forming the tapered end 5 towards shaft 23, especially if the forming is done manually, by hand for example. The view shows housing flanges 22, accessible or available bolt-securing means 13 which are used for rigidly securing the integral tabs or ears 28, of apparatus 26, to the face of flange 22, of the forward 25 portion of housing 24. The forward upwardly formed air, water and debris shield member 29 has an upper end 30 spaced from member 4, as shown in FIG. 4. The, at least one, overlapping edge 4' is necessary because this allows a person to open member 4 up so that it may be threaded over the shaft 23 without dismantling any portion of the universal joints, for example. Of course the edge 4' is not necessary if one desires to dismantle the universal joints (not shown) or the structure shown in FIGS. 6, for example, of member 42, is desired.

The head of the bolt unit 35 is shown but it is to be understood that 35 generally also represents a lockwasher and nut means thereon also.

FIG. 4 shows substantially a sectional view taken along sectional line 3-3 of FIG. 3. The view shows the fluid-impermeable apparatus structure 26 which substantially retains the dripping or thrown-out fluid 36 which leaks past the shaft seal, not shown, in the end 32 of the differential.

This particular apparatus 26 is preferred to be made from a material which is fluid resistant and/or fluid impermeable and having material in the receptacle 31 and in the dripping and centrifugally thrown-out-fluid-catching collar 4. Truck driving axle carriers and the like are also to be covered by this collarlike apparatus 26. FIG. 4 shows the accessible bolts 13 which retain the fluid seal and drive shaft bearing that are housed in the end 32 of the differential housing 24. The bolt means 13 can thereby be utilized for removably securing the collar 4 to the housing end 32. The view shows the leaking fluid 36 which is thrown out by centrifugal force in a substantially pinwheel fashion, as the drive shaft 23 is swiftly rotating, when the motor vehicle is in a forward drive motion and especially when it is traveling at a high speed. The fluid 36, as shown, has leaked past the shaft 23 seal and is being thrown out against the inside portion of the fluid-retaining collar 4. The view shows the fluid 36 as it, for example, drips down and into the receptacle 31, having material 20 retained therein. The tapered portion 5 of the collar 4 is to prevent any fluid which may drip from the top, short portion 42, of the taper 5 and into the longer extended portion 43 thereunder, as shown. The receptacle 31 or apparatus 26 bottom portion of the differential housing 24 flange 22 and extends upwardly at an angle therefrom and is substantially tangent and in spaced relation to the rear curved portion 15 of the differential housing 24.

The above apparatus 26 and that shown in FIG. 1 may also be made from a material which is itself a catalyst for the retained fluid 36, if desired, such as CR-MO-W steel and the like.

The differential housing flange 22 accessible bolt 13 means are used for removably securing the configurated angular shaped apparatus 26. The accessible flange bolts 13 means are shown on both sides, in solid and in dashed-line outline, opposite each other, so that the ear 28 may be removably secured to whatever side has the bolt 13 head. If a nut, not shown, on an accessible bolt 13 threaded portion then the ear 28 may be secured under the side desired or deemed necessary. Some of the housing bolts are threaded into and through an opposite flange 22, in which case the original accessible bolt 13 is removed and longer bolt 35 means, not shown, is inserted in its place whereby the ear 28 is slipped thereover. Since ear 28 has an opening for receiving the bolt 13 body, the extended and threaded portion of the new bolt 35 means having a lock washer and nut assembly is used for removably securing the at least one ear 28 to the housing flange. The latter arrangement allows the ears 28, if both or two are used, to be removed from the housing 24 without disturbing or loosening the bolt portion of the unit 35, shown in FIG. 3, and thereby the differential flange joint is not disturbed. This arrangement is especially good when a gasket material, now shown, is between the differential flange 22. The inside bottom wall 31 portion of the receptacle or apparatus 26 may also be in spaced relation to the circular or curved bottom portion of the housing 24 flanges 22, if so desired, or material 20 may also be therebetween for cushioning means but still a draughting flow of air will still flow thereover, over and against at least one portion of the retained fluid 36 and flow out and over the rear side of the apparatus 26, as shown by the airflow arrows 49.

Catalyst, bacteria and the like are to be inserted in receptacle 31 area or material 20 therein as disclosed for FIG. 1.

The material 20 is, for example, an air filter material as disclosed in FIG. 12 may also be contained in the receptacle 31 portion of the apparatus 26. A catalyst for the retained fluid, may also be retained or imbued into the receptacle 31 and/or material 20, as is later disclosed in this specification. Hydrocarbon-consuming bacteria can also be retained in the receptacle 31 or material 20 therein if desired or deemed necessary.

The tabs or ears 58 are shown integrally and rigidly secured to the sidewalls 59 by a bolt and nut means 35, shown in FIG. 3. Of course an opening, now shown, is created by the downward formed ears 58, through which fluid 36 will flow into receptacle 31 or material 20 therein.

The above structure may also be made integral by welding, riveting and the like or be a one-piece structure, if desired as in end 8 and collarlike member 4, disclosed in FIG. 1, for example.

FIGS. 5 and 6 show a one-piece, leaking-fluid and/or a thrown-out fluid 36 capturing sleeve or collar 41 which is retained on the transmission extension end 9 or housing 24, end 32, shown in FIG. 4. The collar 41 is oil resistant but not necessarily fluid 36 impermeable, but a fluid impermeable one is preferred. The view shows the collar 41 as having a tapered snout 5 and the wire 44 means for securing the collar 41 on the 9 or 32 and members. Strapping, clamping, banding, adhesive means and/or the like can be used for securing the collar, if desired. If an elatomer or similar material is used, the collar 41', may be stretched over the 9 or 32 members. Thereby no other but a resilient means must be generally used for retaining the collar 41 thereon. The collar 41 having material 20 therein could retain the dripped-in fluid. An opening, not shown, could be in a bottom rear portion of collar 41 as shown in FIG. 6 where the fluid 36 is leaking or dripping out and into the receptacle 26 or into a small attached receptacle 50, as is generally shown in FIG. 8 in dashed-line outline being banded 44 to collar 41, if desired.

FIGS. 7 and 8 show a split, 9, collar 41 with a banding 44 means therearound. The split, overlapping collar 4' permits a person to thread to the collar 41 over the shaft 23 and over and onto the extension end 9 or end 32 and without dismantling any portion of the motor vehicle. The small receptacle 50 may also have a curved bottom wall, a curved forward and end walls so the receptacle 50 would at least partially conform to the curved portion of the housing end 9 if it is used therewith, and especially when the collar 41 and receptacle 50 are banded, strapped, wired, and the like together. Thereby, generally all the disclosed members would fit smugly to each other, if desired or deemed necessary. The receptacle 50 should not, preferably, have its bottom portion below the curved bottom portion of the flanges 22 of the differential housing 24 of FIG. 4, partially shown in dashed line outline, when it is checked in a level position. The receptacle 26 and collar 41' may be made of any desired material disclosed for making receptacle 1 and the collar 4. The receptacle 50 and collar 41' may also be made from any rubber, elastomer, synthetic elastomer and the like material, that collar 41 is also preferred to be made of, whereby the collar 41' is at least substantially fluid for oil resistance. Metal foil may also be used for collar 41', if desired or deemed necessary because it is fluid resistant and fluid impermeable and is readily made by hand to conform to generally any desired shape especially if it is made from aluminum, copper and the like, soft workable metal. The tapered portion 5 could be crimped all around, by finger or handtool manipulation, if necessary. The strap 44' is a plastic strapping material which has an opening in one end and a plain or side serrated or barbed tongue. If the collar 41', for example, is made of a nylon material and the like, which is oil resistant but is slightly effected by water, which may eventually pass through its thin wall, then it is to be considered in this specification as fluid impermeable for it is not affected by a petroleum oil and the like, which is a very important factor for this invention.

FIG. 9 is a sectional view taken along sectional line 1—1 of FIG. 2 and shows the general shape of member 3 having inwardly formed-over bezellike sides 16 which substantially retain the material 20 therein. The bottom wall of member 3 having a generally dished down V-shaped form whereby a space 21 is generally formed under material 20. Thus the dripping and/or centrifugally thrown-out fluid 36, from member 4, will flow down under material 20, from the collarlike member 4 and into the receptacle 1. Should the material 20 be flexible and air permeable, such as generally is used for air filters, or be a soft fluid-absorbent material and the like, then the bottom wall of member 3 may be generally flat shown in dashed-line outline 46, because the material 20 will be against the inside bottom wall in any event, and space 21 will disappear. The fluid 36 will thereby flow through the length of material 20 and into the receptacle apparatus 1. The shape of member 3 is such that material 20 may be found to be undesirable therein, and thereby may be eliminated accordingly. Thus the fluid's rate of oxidation and thickening would be directly increased partially in the member 3 by at least the generated draft of air created when the motor vehicle is in forward drive motion, especially at high motor vehicle speeds as is generally shown by the air 49 arrow means in FIG. 2, for example.

FIG. 10 is a cross-sectional view of a collarlike apparatus structure 52 being secured on the transmission extension 12 and 9 and/or the differential end 32 for also retaining dripping and centrifugally thrown-out fluid 36, as generally is disclosed for collarlike members in FIGS. 1, 4, 6 and 8, for example, which FIGS. may have the forward portion 5 straight out 5' as shown in FIG. 8 instead, as desired, as long as material 20 is therein, to retain the fluid 36. This collarlike member 52 has an enlarged formed pouchlike or semicircular 48 portion for retaining fluid 36 and also material 20, in its fluid-retaining receptacle 48 portion, with catalyst and/or bacteria for fluid 36 also being imbued or retained in material 20 which is preferred to be inserted, and retained in at least one inside 48' portion of the apparatus structure 52 which thereby retains directly therein, the largest volume of fluid 36, of all the previously disclosed collarlike apparatus structures. A strapping band 44' means with its one end 51 inserted through its other end 51' or a wire strapping 44 means with its ends twisted 45, as shown in FIGS. 5 and 7 is desired. Large water hose clamps are also desirable for generally rigidly securing the rear 41' portion of structure 52 around end 9 and/or end 32. The upper portion of structure 52 may also be split and having, for example, overlapped edges 14' as is generally shown in FIG. 7. The inner portion of end 41' may also be adhesively 52' means, secured and/or sealed on end 9 and/or 32, if desired, in addition to a strapping means 44' in order to construct a solid, safe and sealed structure, since there is a lot of vibration, especially at end 32 of the motor vehicle.

FIG. 11 shows substantially the inside of apparatus receptacle 1 having here integral ears or brackets 54 which have at least one bolt 13 or 35 receiving opening 55 therethrough its outwardly formed end. The receptacle 1 has a separate fluid-retaining bezellike 61 receptacle 62 retained therein, and which receptacle having at least one opening 70 therein. Material 20 is also shown retained in receptacle 62, the material 20 may also be a catalyst, and or fluid-eating bacteria placed, charged or imbued therein. The view also shows in dashed-line outline where the brackets 54 are transformed into hanger 2 means having integrally formed ends 2' thereon for reaching up for example to the crankcase oil pan flange accessible or available bolt 13 means, not shown, but are shown in copending application Ser. No. 508,624, in FIG. 2 thereof.

FIG. 12 shows a sectional view of receptacle 1 taken along sectional line 6—6 of FIG. 11, and shows the separate receptacle 62, with material 20 therein. The view shows an integral rear bracket or ear 54 rigidly secured to an underside 73 of a crossmember 67 portion of the frame, for example, by use of available opening or bolt 13 or a separate bolt 35 and nut means. The forward brackets or ears 54, are on each side of receptacle 1, are shown rigidly secured to an underside portion 66 of the forward cross member 65, of the motor vehicle's frame, using here also preinserted openings and/or available bolt means 13 or a separate bolt 35 and nut means. The openings 13 disclosed above could be preinserted by the motor vehicle manufacturer, as are, for example, seatbelt-bolt-anchoring openings in the floor of the vehicle. It should be noted that the forward end of the receptacle 1 is extended so that the receptacle 1 will catch dripping fluid from the front seal, not shown, and crossmember 65 portion of the frame and also so that a generated draft of air one step of this process invention, shown by arrow 49 means, will enter over the forward wall portion of receptacle 1, above and through at least one portion of the material 20, over and against at least one portion of the fluid 36 retained therein and existing out over the rear wall portion of receptacle 1. At least one portion of the outer bottom wall portion 64 of the crankcase oil pan sump must be in spaced relation from the material 20, in receptacle 62, so that the lubricating oil therein will be indirectly cooled, by convection, of some of the oil's heat into the generated draft of air which is created when the motor vehicle is in forward drive motion, especially at high highway and/or racetrack speeds. Thereby, here the lubricating oil's or fluid's temperature is not increased to the point that proper lubrication of the bearings is impaired by breakdown of oil film, since one of the oil's duties or functions of cooling of the bearings is thereby not impaired, especially at high motor vehicle speeds. Also, the rate of oxidation and thickening of the lubricating oil and the corrosive acid buildup is not increased in the oil pan sump when the temperature of the oil is maintained at a lower temperature by proper air cooling of the oil pan sump's outer bottom walls, which air cooling is a designed function created by the vehicle manufacturer, unless there is an internal cooling of the oil by water piped means from the radiator, as in at least some if not most or all of the present automatic transmissions oil-cooling systems. Only then could the bottom of the oil pan sump could be imbedded into the material 20. At least one known prior art oil pan sump has its oil sump's wall corrugated for additional air cooling of the oil therein.

It may also be necessary to use the rear 2 side ear or brackets 54, to be secured to the frame 73 portion, especially when the lower end of trough member 3 is desired to be secured to the rear wide ear 54 or on the inside of the now troughlike shaped receptacle 1 as is generally shown in FIG. 1, for example.

FIG. 13 shows receptacle 1 having a front and rear bezellike members 61 integrally and/or cappingly sealed on the tap edge of the front and rear walls thereof and partially along the sidewalls also. The dashed-line areas 77 indicates that the bezeled structure 66 may be carried entirely around the top of the desirable 1 walls, if desired. It should be noted that if this large forward-ended bezel 61 receptacle 1 shown in FIG. 12, under the member 65, then the dripping oil will still be caught or retained in the receptacle 1, of FIG. 13, but the generated draft of air 49 would be partially blocked off. This FIG. 13 structure may still be desirable, since proper air cooling of the oil pan sump's bottom wall may still be obtained by other paths found by the air 49 into receptacle 1 and yet flooding of the receptacle 1, shown in FIG. 13, by surface water, slush, debris and the like is substantially prevented by the large ended bezel 61 portion.

The FIG. 13 shows a section of the motor vehicle's exhaust pipe 79 located close or adjacent to a wall portion of the receptacle 1. This is desirable because some of the heat 80, from the pipe 79, will be transmitted to the receptacle 1 wall and then to the fluid 36, not shown, therein. This process step of utilizing heat from the exhaust system will raise the temperature of the retained fluid 36, shown in FIG. 12 and thereby additionally will raise its rate of oxidation and thickening in the receptacle 1.

The bezellike members 61 and/or 61 and 77 help to retain the material 36 in receptacle 1 and also substantially prevent fluid 20, should it be therein in excess volume, from substantially being spilled air ejected, or virtually dumped out when the motor vehicle is out of level; declining; reclining; abruptly started, stopped or curving at a high rate of speed.

The ears or brackets 54 having openings 55 therein are shown in three places, but they may also be in four or five places on receptacle 1 if desired. Also the dashed line hangers 2 will serve to make the receptacle 1 adjustable, generally through use of opening 55', to obtain the proper spaced relationship of the receptacles 1 material 20 to the bottom of the oil pan sump 64, which is shown in FIG. 12 and which adjustability of the receptacle 1 or material 20 is generally disclosed in copending application Ser. No. 532,831. The hangers 2 may have opening 55' therein and the top of hanger 2 ends may also be straight up as shown by the dashed lines.

FIG. 14 is a sectional view taken along line 7-7 of FIG. 13 and shows the location of exhaust pipe 79, heat waves 80, dished-down portion 76 of the top of bezellike member 61, fluid 36, material 20 dashed-line hangers 2 and general shape of ears 54 which may be 2' if extended to the top of hangers 2 as shown in FIG. 11, for example.

FIG. 15 shows a special corrugated or wave-formed shaped 82 bottom wall of a crankcase oil pan sump 64 being in combination and against the surface of material 20, which is retained in receptacle 1, partially shown. The material 20 may also be retained in a trampoline 83 type of fluid 36 retaining structure or device, if desired, and still without overheating will at least not ruin the bearings of the motor vehicle when it is traveling at a high rate of speed, as previously disclosed in FIG. 12.

FIG. 15 further shows generated draft of air 49 arrows, into corrugated 82 openings 81 which are at least in the forward bottom wall portion of the sump 64 for cooling substantially the same area of the oil sump's bottom wall thereby or at least preventing the oil 84 (see FIG. 16) film's breakdown and thereby not creating the disclosed bearing seizure or disaster to the bearings.

When hydrocarbons, oxides of nitrogen and the like are emitted from the dripped fluid which is thereon a hot, sun-heated surface, or is exposed to the hot sunlight, a photochemical reaction produces irritants and haze. When these byproducts are retained in an area by climatic conditions or topographical barriers, the concentration of irritants can produce severe discomfort. The Los Angeles basin has all the necessary ingredients to produce such conditions about 100 days per year.

Hydrocarbon consuming or utilizing bacteria, means 46, which are preferred to be areobic and which utilize the described film or the hydrocarbons therein, for the primary purpose of gaining energy for their life processes in much the same way that higher animals utilize carbohydrates, fats and proteins. The bacteria are characterized by the ability to subsist upon various hydrocarbons as a sole source of organic matter in their diet. Hydrocarbons when utilized in this manner serve the identical purpose that they do when used in an internal combustion engine, the production of utilizable energy with which to do work. Specific catalysts are therein the bacteria and are also found in all be material. These naturally occurring catalysts are called enzymes. Enzymes are catalyst in exactly the same sense as are inorganic catalyst. Enzymes, like other catalysts, do not shift the equilibrium point of a reaction, but only hasten its attainment. The rate of enzyme-catalyzed reactions is approximately doubled for a 10° C. rise in temperature, but from an engineering standpoint it is necessary to weigh this factor against the greater rate of destruction of enzymes at higher temperatures.

The catalyst means 46 material composed of tungsten, may also be the material for receptacle 1.

The porous material 20 and/or the receptacle 1 having the disclosed bacteria, being an organic catalyst, and the material 20 or receptacle 1 also may have the disclosed inorganic catalyst 46 means whereby a granular, and/or a catalyst which is soluble in the retained fluid. A colloidal solid can be applied on the inside bottom wall portion of receptacle 1 and a catalyst, for the retained fluid 36, is applied on the colloidal solid, which is not a catalyst carrier. A solution of copper and chromium nitrates can also be imbued in the colloidal solid. The colloidal solid can be microcrystalline of cellulose. Hard alumina (a catalyst) can be bonded on the receptacle 1 inside bottom wall surface and a metal catalyst, for said fluid, or combination of catalyst, for said fluid, in both oxide and halide form can be deposited on the catalyst, alumina base. Metals of cobalt, molybdenum, platinum, palladium, ruthenium, iron, chromium, zinc, copper, chrome and the like can also be deposited on the alumina catalyst base. A synthetic silica-alumina catalyst in pellet form can also be used if desired. The alumina catalyst base can also be imbued with a solution of copper and chromium nitrates or pellets of alumina can be imbued with the copper and chromium nitrates which are placed into the receptacle 1 as desired.

Chromite catalyst prepared on an alumina or synthetic alumina base and bonded in the receptacle 1, whereby the retained fluid contacting the catalyst and a supply of a draughting flow of air which supplies atmospheric oxygen for the catalytic action, whereby the rate of oxidation and thickening of the retained fluid 36 is increased and the fluid volume is decreased. Unsupported catalyst such as copper chromite G-13 and barium-promoted copper chromite G-22 and the like are largely unsupported catalyst, for said fluid and are found in tablet (cylindrical), pellet and the like form.

Catalysts for the oxidation of lubricating oils include a wide variety of compounds, some of which are metal catalyst such as compounds of copper, lead, iron, manganese, chromium, vanadium and the like. Napthenate of iron, copper, lead, silver and cadmium can be placed or piped into the retained fluid, and are effective catalysts, especially if the retained fluid is heated to a higher temperature. Exhaust gases range from about 150° F. to 1,500° F. and thereby the retained fluid can be heated, with use of tubing 79 for example to quite a high temperature as desired or deemed necessary within safety margin against smoke and fire formation and the like. A combination of copper, lead, and iron in bulk or soap form can also be contained in the receptacle 1 or 62 and the like receptacles. Compounds of manganese, mercury, chromium, calcium, vanadium, nickel and the like catalysts can also be used as a catalyst as well as sodium napthenate and calcium naphthenate. Calcium oleate and manganese oleate can also be used as a catalyst for the retained fluid. Oxidation of the retained oil is also accomplished by placing oleum into the receptacle 62,1 and the like receptacles (nestable 62 or not). The catalytic oxidation of automotive exhausts, its known process, catalyst and catalyst carriers and the like are to be used herein and disclosed in this specification as a possible new use. Also the lubricating oil 84 in the improved sump 64, having the corrugated bottom wall 82 will generally prevent the oil 84, shown in FIG. 16, from climbing the sidewalls when making sharp turns at a high vehicle speed, especially if the sidewalls are also corrugated 82, not shown.

FIG. 16 is taken along sectional line 8-8 of FIG. 15, and shows trampoline 83 type of fluid 36 retaining device, material 20, oil pan sump 64 with generated draft of air's 49 arrows showing the air's 49, oil 84, cooling path by arrow means into and against at least one corrugated portion of opening 81. All the oil 84 which is in contact with the inside wall portion of the sides and top wall of openings 81, is indirectly cooled by the motor vehicle's generated draft of air 49 which also additionally increases the rate of oxidation and thickening of the retained fluid 36, in material 20, another step of the disclosed process. Of course it should be understood that the oil pan sump's bottom wall may be raised 60 at an angle at its forward portion, for example, and the rear drain plug portion 59 may be constructed far enough downward, as shown in this FIG. 16, so that the forward raised 60 portion is never embedded in material 20, thereby preserving the oil sump's 64 air 49 cooling requirement. Also a separate piece of stiffer material than is material 20, and if desired having a pocket or holes therein into which the 59 portion of the sump 64 is positioned or retained thereby forcing material 20 away from the sump's 64 entire bottom wall, for said air 49 cooling thereof.

FIG. 17 shows a separate hole 80' perforated wall or corrugated formed material 86 under the oil pan sump's 64 bottom wall so that material 20 will be forced away therefrom, allowing passage of air 49 arrows to generally draft through openings 87, against fluid 36 in material 20, through and against material 20, and against the sump's 64 bottom wall and substantially out the rear of material 86.

The trampoline device 83 is partially also shown. The fluid or oil 84 is shown having a generally U-shaped water pipe 92, which circulates water 93 from the vehicle's water-cooling system, so that the fluid 84 will be additionally cooled, if so desired, but will be required if material 20 is insulatingly forced against the sump's 64 bottom wall, thereby blocking off the air 49 cooling means. The receptacle 1 is also partially shown. The material 86 may also be keyed into a depression of raised surface 89 so that displacement of material 86 under sump's 64 bottom wall is substantially prevented.

The term "summer icing" used in this specification and/or claims is generally derived from the fact that light rain or drizzle, especially after a dry spell in the summer, produces a thin greasy film on the road surface, "which is almost as slippery as ice". That is, especially during the first 15 to 30 minutes after it starts to rain and up to an hour or more in light drizzle. The drizzle or rain tends to float onto the roadway's or highway's surface of a greasy film of oil or fluid dripped or thrown out from motor vehicles.

The term "viscous hydroplaning" and is one which may even be more dangerous than "dynamic hydroplaning" which is on the surface or rainwater. Viscous hydroplaning may occur on a seemingly dry motor-vehicle-traveled highway surface, for example. The seemingly dry surface is no more than a heavy dew mingling with oil or fluid and dust on a well-traveled highway will create a greasy film of moisture that may be microscopically thin, but is sufficient to prevent tires from penetrating and finding safe traction. Flow of air 49 into the receptacle 1 or 62 and against and over the fluid 36 will increase the rate of oxidation and thickening of the fluid 36 therein, especially if catalyst, soil cultures, naturally occuring catalysts or enzymes, hydrocarbon-oxidizing bacteria, is inserted in receptacle 1 and/or material 20 therein. Soil or earth, material 20 may be inserted into receptacle 1 or 62, or into a separate material 20, if desired accordingly.

The bed of catalyst or catalytic chemicals prevent the air from becoming polluted or contaminated by increasing the rate of oxidation and thickening of the otherwise thrown-out or dripped fluid. If the fluid therein was allowed to leak or drip, forming a fluid mess or puddle or allowed to be spilled or dumped onto a hot sun-heated surface and, thereby, be exposed to the sunlight, the emission of hydrocarbons therefrom would become noxious generally further polluting of the air and possibly irritating one's eyes by formation of peroxybenzoyl nitrate.

The above-disclosed apparatus structure may be secured to and under a fluid dripping or thrown-out fluid of a hydraulic mechanism, torque converter hydraulic line connection, gearbox, and the like or any combination thereof.

When the draught of air which is generated during motor vehicular drive it will flow over and generally at times through at least one portion of said material 20. The draught of air will absorb or drive off the fumes which are or may be over the fluid; provide the fluid with oxygen to accelerate fluid oxidation and create a draughty atmosphere through said material, whereby, volatile acids and fluids are accordingly removed, for reducing the volume and increasing the thickening or viscosity of the disclosed fluid 36 in the material 20 retained in the receptacle 1 and/or 62.

The state and federal government is presently cleaning the motor-vehicle-traveled surfaces with surface-scrubbing machines surface-cleaning machines or cleaning with detergents, soaps, and the like. The state alone is presently paying thousands of dollars to clean the thruway areas and toll-collecting areas and thereby millions of dollars is saved for all concerned by use of this process and apparatus structure disclosed in this specification.

All matter is subject to loss due to evaporation and the rate of this loss is due to a function of the physical properties of the material or the retained fluid 36 and especially if the retained fluid is subjected to a drafting flow of arid air. The fluid container is also subjected to a vibrating or agitated motion, as when it is secured under a motor vehicle, which is in forward drive motion over a roughly traveled motor vehicle surface and the like. The rate of oxidation and thickening of the retained fluid may be further increased by adjusting the shape of the retained-fluid receptacle and the attack on, over and therethrough by the motor vehicular forward-drive-generated draft of air.

The retained fluid receptacles disclosed in this specification may also, all or any portion thereof, be made of metal, plastic or as are new milk cartons which are made of paper or paperboard, and coated with polyethylene, especially the bezellike 61 receptacle 61 shown in FIG. 11, for example, that could be made to be a disposable unit with material 20. The disclosed fluid-retaining Buna-n 20, may also be accordingly inserted in material 6, 117, 118, 119, 120, or 121 and or any combination thereof which is desired or deemed necessary which latter 6 materials are disclosed in my copending application Ser. No. 532,831.

The latter portion of this specification contains further descriptive detailed materials, coatings apparatus receptacle and retaining means, coatings and the like which may be necessary for a more detailed specification. Fabrics which are woven and nonwoven are used for the outside, inside, or core of the fluid-retaining receptacle 62 and are to be plastic or elastomer coated as desired or deemed necessary for creating fluid impermeability. Nylon is also to be considered that is coated with Buna-n also makes a good barrier for the retained fluid 36. Elastomers such as natural rubber, SBR, polyisoprene, neoprene, silicone, hypalon, polybutadiene, butyl, polyurethane, nitrile, polysulfide, polyacrylate, fluorocarbon and the like are to be used as desired or deemed necessary for a coating, boot, sleeve, bag, coatings and the like, for the oil resistant and/or fluid-impermeable receptacle 62 which are reusable or disposable and one with or without bezel 61, as on receptacle 62. The elastomers and/or receptacle 62 may also have an open-cell foam material 20 foamed therein if so desired, and loose or bonded fibers of hair, manmade metal, and the like and with oil-resistant, elastomer or plastic material as a binder, are also to be used as being material 20.

Some of the open-cell foam material is made from latex rubber, polyvinyl, polyether urethane, polyurethane, chloride, polyester, polyepoxies, vinyl, phenolic, polyolefin, silicone, and the like which are or can be rigid or semirigid or flexible or super soft and used as desired or deemed necessary. Since glass fibers are the fastest growing and their applications are almost entirely industrial and are fluid resistant and heat resistant whereby they are also preferred for being material 20. Other fibers which can be used are asbestos, sisal, cotton, jute, manmade and metallic fibers. The resin used are preferred to be polyesters but epoxies, phenolics and silicons are also to be considered for constructing the receptacle 62 as desired or deemed necessary.

A plastic film or sheet which is fluid impermeable may also be hand-nested to thereby form receptacle 62 with material 20 therein. The material 20 is further preferred to be an airpermeable and fluid-permeable, open-cell foam, fibrous, curly-hair-bonded material, also glass wool, manmade fiber which is loose, in batting form, or which is resin or elastomer (oil resistant) bonded together.

Ninety percent of the urban Americans live in localities with polluted air, but only half of all these people are served by local air-pollution control programs. It is unmistakably clear that air pollution is associated with important respiratory diseases, such as lung cancer, emphysema, chronic bronchitis, and asthma, but progress or no program is effective if it is not backed by the public.

When hydrocarbons, oxides of nitrogen and the like are emitted from the dripped or centrifugally thrown-out fluid which is there on a hot, sun-heated surface, or is exposed to the hot sunlight, a photochemical reaction produces irritants and haze. When these byproducts are retained in an area by climatic conditions or topographical barriers, the concentration of irritants can produce severe discomfort. The Los Angeles basin has all the necessary ingredients to produce such conditions about 100 days per year.

In this time of ever-increasing vehicular drive and highspeed traveling, whereby an ever increasing amount of motor vehicles are estimated 101,000,000 to be on the highways, thruways, freeways, turnpikes, streets, roads and the like, by 1972.

This is an indicator to at least provide safer, cleaner and uncontaminated highway surfaces on which all persons in motor vehicles must travel, and this is the basis for this very needed process and apparatus invention.

While several embodiments of this process and apparatus invention has been disclosed, it is understood that the inventive idea may be carried out in a number of ways, and it is intended to cover all variations and modifications falling within the scope of the appended claims and equivalents thereof, especially when the claims are read in light of the specification and/or the objects of the process invention.

The polygonal, rectangular, square, round, troughy, triangular, or other polygonal configurations of the receptacle 1 and 62's shape and the like are and will be apparent to those skilled in the art once this invention is disclosed of its importance and need thereof, by all, as mentioned in the objects. The receptacle 1 and 62 are to have square, rounding, sharp, blunt, and the like shape which fluid impermeably and integrally merge the rectilinear, curvilinear or other suitable corners, bends and the like portions thereof into fluid-impermeable structure, as described.

Having described my invention, I claim:

1. A process for increasing the rate of oxidation and thickening of fluid drippings and centrifugally thrown, in substantially pinwheel fashion, fluid that is retained substantially in a fluid-retaining receptacle secured substantially to a motor vehicle, the steps comprising:
   a. catching said drippings and said fluid substantially in said receptacle which is secured in associated arrangement to and under at least one portion of said vehicle;
   b. arranging said receptacle so that a draft of air, generated from forward drive motion of said vehicle which is traveling at a high rate of speed, flows into and over at least one portion of the inside area of said receptacle and substantially against at least one surface portion of said drippings and said fluid and exiting out of said receptacle; whereby said drippings and said fluid will be dehydrated and reduced in volume and have a greater viscosity for at least being substantially prevented from being spilled, ejected or dumped out of said receptacle when said vehicle is traveling at the high rate of speed and is abruptly stopped, curving and additionally being in and out of level position substantially on a highway or a racetrack surface.

2. The process of claim 1 including the additional step of guiding said air also into at least one substantially central portion of the inside area of said receptacle and against and over at least one portion of said drippings and said fluid to further increase the rate of oxidation and thickening of said drippings and said fluid retained in said central portion of said receptacle.

3. The process of claim 1 including the additional step of substantially filtering motor-vehicular-traveled surface debris out of said receptacle having a bezellike inwardly formed integral rim around its upper wall portion to prevent obstruction of said airflow over the center portion of said receptacle and against at least one portion of said drippings and said fluid.

4. The process of claim 1 including the additional step of additionally utilizing said draft of air over at least one central portion of said receptacle for cooling at least one portion of substantially the lowest underside substantially central exposed wall surface of at least one oil pan of said vehicle to also prevent an increased rate of temperature, oxidation and thickening of lubricating fluid in said pan.

5. The process of claim 4 including the additional step of additionally utilizing said air over said fluid drippings for also cooling at least one lowest outer substantially central exposed wall surface of the crankcase oil pan sump for substantially preventing an increased rate of temperature, oxidation and thickening of lubricating fluid retained in said sump.

6. The process of claim 1 including at least one additional step of having at least one catalyst means and a separate material pad means for said drippings and said fluid retained in said receptacle for further increasing the retaining rate and the rate of oxidation and thickening of said drippings and said fluid retained in said receptacle.

7. The process of claim 1 including the additional step of having at least one separate material means retained in said receptacle for increasing the rate at which at least one portion of said drippings and said fluid is substantially retained in said receptacle.

8. The process of claim 1 including the additional step of having at least one material means retained in said receptacle and having hydrocarbon-consuming bacteria means retained in at least one portion of said material means for further increasing the rate of oxidation and thickening of said drippings and said fluid retained in said receptacle.

9. The process of claim 1 in which at least one further step is made by having at least one portion of the heat from the exhaust system of said vehicle increase the temperature of said drippings and said fluid retained in said receptacle and which receptacle having at least one separate material means retained therein for retaining at least one portion of said drippings and said fluid therein.

10. The process of claim 9 including the additional step of having a catalyst means for said drippings and said fluid retained in at least one portion of said receptacle for further increasing the rate of oxidation and thickening of said drippings and said fluid retained substantially in said receptacle.

11. The process of claim 10 including the additional step of having hydrocarbon-consuming bacteria means retained in at least one portion of said material for further decreasing the fluid volume retained substantially in at least one portion of said material means.

12. The process of claim 1 including the additional step of having at least one catalyst means for said drippings and said fluid retained in at least one portion of said receptacle for further increasing the rate of oxidation and thickening of said drippings and said fluid retained in said receptacle.

13. The process of claim 12 including the additional step of having at least one portion of said catalyst means for said drippings and said fluid imbued into at least one inside surface portion of said receptacle for further increasing the rate of oxidation and thickening of at least one portion of said drippings and said fluid retained in said receptacle.

14. The process of claim 12 including the additional step of having at least one separate material means retained in said receptacle for further increasing the rate at which at least one portion of said drippings and said fluid is substantially retained in at least one portion of said material means.

15. The process of claim 12 including the additional step of having at least one separate material means retained in said receptacle for increasing the rate at which at least one portion of said drippings and said fluid is substantially retained in said receptacle.

16. The process of claim 15 including at least one additional step of having hydrocarbon-consuming bacteria means in at least one portion of at least one said material means for further increasing the rate of retainment, oxidation and thickening of at least one portion of said drippings and said fluid.

17. The process of claim 15 including the additional step of having said catalyst means retained in at least one portion of said material means for further increasing the rate of oxidation and thickening of at least one portion of said drippings and said fluid retained substantially in said material means.

18. The process of claim 15 including the additional step of having said catalyst means for said drippings and said fluid imbued into at least one portion of said material for further increasing the rate of oxidation and thickening of at least one portion of said drippings and said fluid retained in at least one portion of said material.

19. The process of claim 15 including at least one additional step of having hydrocarbon-consuming bacteria means retained in at least one portion of said material means and said catalyst means retained substantially in a separate bezel-topped package means for still further increasing the rate of oxidation and thickening of said drippings and said fluid retained in said package.

20. The process of claim 15 including the additional step of having air means piped and substantially bubbled into at least one portion of said drippings and said fluid for further increasing the rate of oxidation and thickening of said drippings and said fluid retained in said receptacle.

21. The process of claim 15 including the additional step of having said catalyst means imbued into at least one portion of said material means which is retained in a separate nestable receptacle means which is retained in said secured receptacle for further increasing the rate of oxidation and thickening of said drippings and said fluid that is retained in at least one portion of said material means.

22. The process of claim 21 including an additional step of having heat means which is convected into at least one portion of said drippings and said fluid from at least one portion of the exhaust system of aid vehicle for further increasing the rate of oxidation and thickening of said drippings and said fluid by increasing the temperature of said drippings and said fluid.

23. The process of claim 22 including the additional step of having hydrocarbon-consuming bacteria means retained in at least one portion of said material means for further increasing the rate of oxidation and thickening of said drippings and said fluid substantially retained in said receptacle means.

24. The process of claim 1 including the additional step of having water from the cooling system of said vehicle piped through at least one portion of said oil and piped back to said cooling system for additionally cooling the oil retained in the crankcase oil pan sump.

25. The process of claim 1 including the additional step of further increasing the rate of oxidation and thickening of said drippings and said fluid retained in said receptacle by having at least one separate material means retained in said receptacle and having heat means from at least one portion of the exhaust system of said vehicle, by heat convection means increase the temperature of said drippings and said fluid.

26. The process of claim 25 including the additional step of further increasing the rate of cooling the oil retained in the crankcase oil pan sump by having the bottom of said sump in a substantially corrugated form so that said air will substantially pass draftingly through and against at least one bottom-configuration wall portion of said sump.